(12) United States Patent
Armstrong et al.

(10) Patent No.: US 11,920,493 B2
(45) Date of Patent: Mar. 5, 2024

(54) AIRFOIL HAVING A STRUCTURAL CELL AND METHOD OF FORMING

(71) Applicant: GENERAL ELECTRIC COMPANY, Schenectady, NY (US)

(72) Inventors: Douglas Lorrimer Armstrong, Needham, MA (US); Devin R. Dilley, Evendale, OH (US); Elzbieta Kryj-Kos, Evendale, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/681,162

(22) Filed: Feb. 25, 2022

(65) Prior Publication Data

US 2023/0272718 A1 Aug. 31, 2023

(51) Int. Cl.
*F01D 5/14* (2006.01)

(52) U.S. Cl.
CPC .......... *F01D 5/147* (2013.01); *F05D 2220/30* (2013.01); *F05D 2230/50* (2013.01); *F05D 2300/601* (2013.01)

(58) Field of Classification Search
CPC .......... F05D 2220/36; F05D 2300/603; F05D 2300/6034; F05D 2300/601; F05D 2230/50; F05D 2220/30; F01D 5/282; F01D 5/147
See application file for complete search history.

(56) References Cited

U.S. PATENT DOCUMENTS

| | | | |
|---|---|---|---|
| 5,488,017 A * | 1/1996 | Szweda | C04B 35/6264 |
| | | | 428/688 |
| 6,514,046 B1 * | 2/2003 | Morrison | F01D 9/02 |
| | | | 416/241 B |
| 8,167,573 B2 * | 5/2012 | Merrill | F01D 5/288 |
| | | | 416/241 A |
| 8,753,091 B1 * | 6/2014 | Braley | B29D 99/0028 |
| | | | 416/226 |
| 9,303,520 B2 | 4/2016 | Hasting et al. | |
| 9,616,629 B2 | 4/2017 | Fabre et al. | |
| 10,145,039 B2 | 12/2018 | Marchal et al. | |
| 10,508,559 B2 | 12/2019 | Gimat et al. | |
| 10,589,475 B2 | 3/2020 | Kray et al. | |
| 10,724,159 B2 | 7/2020 | Marchal et al. | |
| 11,015,462 B2 | 5/2021 | De Gaillard et al. | |

(Continued)

FOREIGN PATENT DOCUMENTS

| | | |
|---|---|---|
| EP | 2844837 B1 | 9/2018 |
| EP | 3798418 A1 | 3/2021 |

OTHER PUBLICATIONS

Douglas L. Armstrong et al., Development of a Low-Cost Integrated RTM Horizontal Stabilizer that Flies on Bell Helicopter's MAPL, 15 pgs.; 2005.

*Primary Examiner* — Courtney D Heinle
*Assistant Examiner* — Andrew Thanh Bui
(74) *Attorney, Agent, or Firm* — McGarry Bair PC

(57) ABSTRACT

An airfoil for a turbine engine, the airfoil having an outer wall defining an interior and a camber line extending through the airfoil, and at least one cell located within the interior. The at least one cell can include a forward portion and an aft portion with respect to the camber line. The forward portion and the aft portions can be connected by side portions. A braided fabric can be provided on at least one of the forward or aft portions, while a braided fiber can be provided on at least one of the side portions.

20 Claims, 8 Drawing Sheets

(56) References Cited

U.S. PATENT DOCUMENTS

| | | | |
|---|---|---|---|
| 11,060,409 B2 * | 7/2021 | Jones | C04B 35/80 |
| 11,136,888 B2 | 10/2021 | Husband et al. | |
| 2012/0171025 A1 | 7/2012 | Tudor et al. | |
| 2022/0290572 A1 * | 9/2022 | Gunasekera | F04D 29/023 |

* cited by examiner

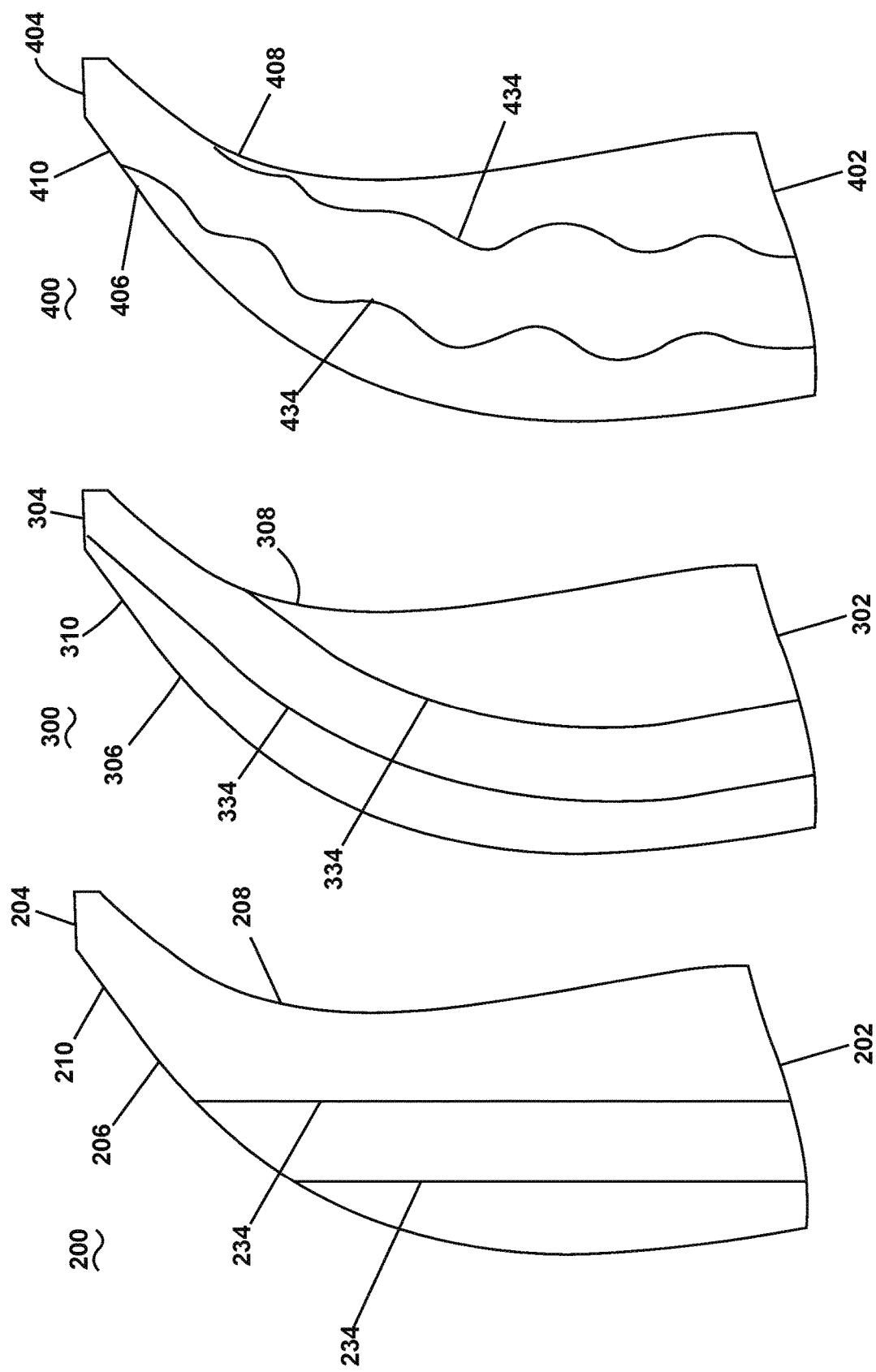

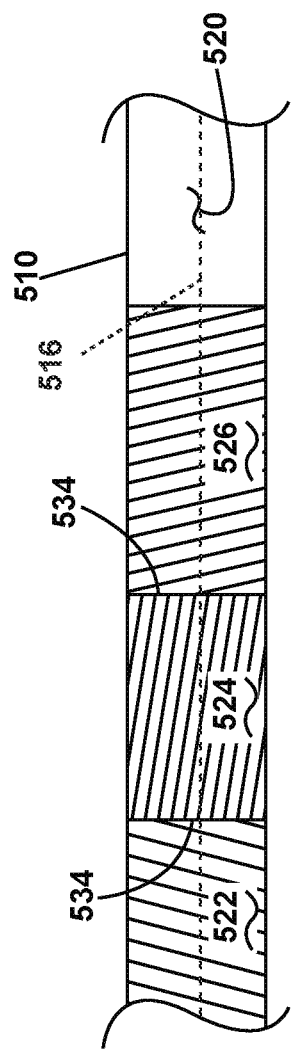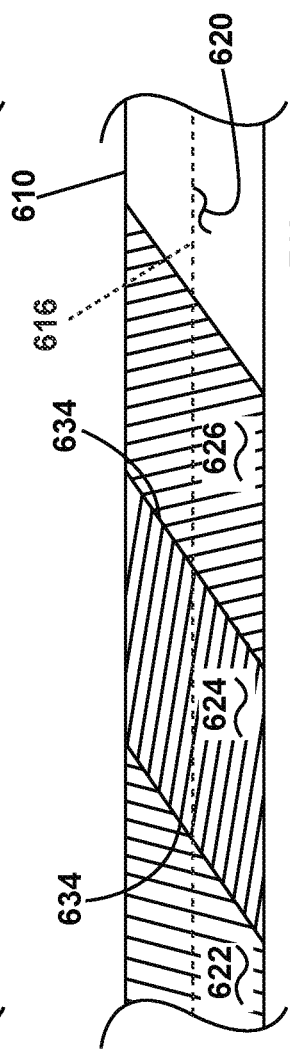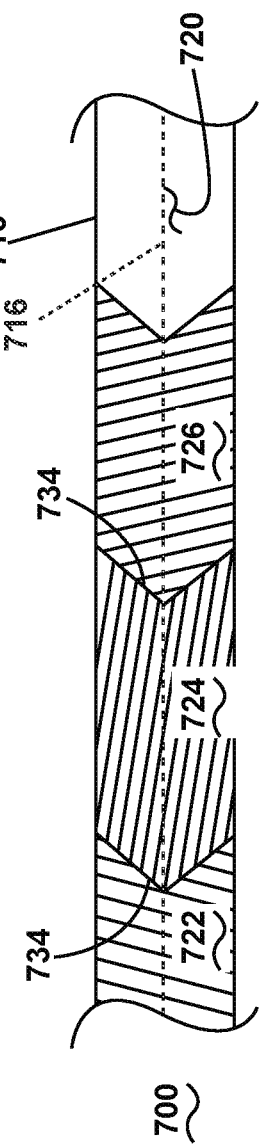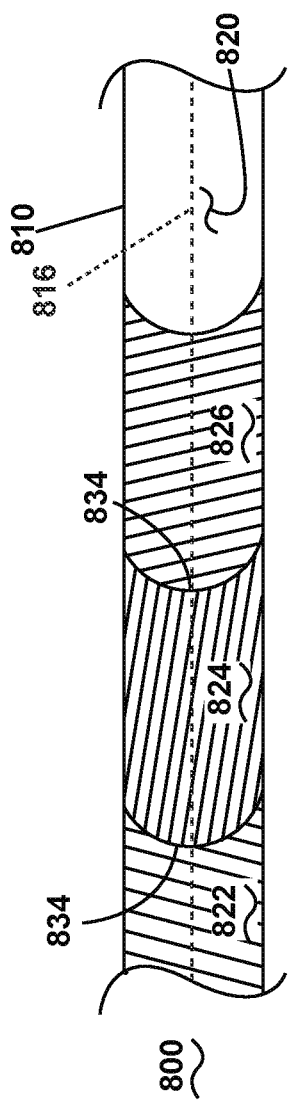

US 11,920,493 B2

AIRFOIL HAVING A STRUCTURAL CELL AND METHOD OF FORMING

TECHNICAL FIELD

The disclosure generally relates to an airfoil having a structural cell within an interior of the airfoil.

BACKGROUND

Turbine engines are rotary engines that extract energy from a flow of working air passing serially through a compressor section, where the working air is compressed, a combustion section, where fuel is added to the working air and ignited, and a turbine section, where the combusted working air is expanded and work taken from the working air to drive the compressor section along with other systems, and provide thrust in an aircraft implementation. The compressor and turbine stages comprise axially arranged pairs of rotating blades and stationary vanes. The turbine engine can be arranged as an engine core comprising at least the compressor section, the combustion section, and the turbine section in axial flow arrangement and defining at least one rotating element or rotor and at least one stationary component or stator. A fan section can be provided upstream the compressor section and draw ambient air into the core, and in a bypass configuration, flowing a portion of the ambient air around the core.

The rotating blades and stationary vanes can be collectively referred to as airfoils within the turbine engine. The airfoils can be defined by an outer wall and an interior. The interior can include various structures for structural purposes. In some instances, the interior of the airfoil can include structural supports that strengthen the airfoil.

BRIEF DESCRIPTION OF THE DRAWINGS

A full and enabling disclosure of the present description, including the best mode thereof, directed to one of ordinary skill in the art, is set forth in the specification, which refers to the appended FIGS., in which:

FIG. 7A is a schematic perspective illustration of an exemplary airfoil that can be used as the at least one airfoil of FIG. 1, the exemplary airfoil including a set of exemplary cells linearly through the exemplary airfoil.

FIG. 7B is a schematic perspective illustration of an exemplary airfoil that can be used as the at least one airfoil of FIG. 1, the exemplary airfoil including a set of exemplary cells non-linearly through the exemplary airfoil.

FIG. 7C is a schematic perspective illustration of an exemplary airfoil that can be used as the at least one airfoil of FIG. 1, the exemplary airfoil including a set of exemplary cells non-linearly in a wave formation through the exemplary airfoil.

FIG. 8A is a schematic, top-down, cross-sectional illustration of an exemplary airfoil that can be used as the at least one airfoil of FIG. 1, the exemplary airfoil including a set of exemplary cells forming a set of cell webs extending linearly through the airfoil.

FIG. 8B is a schematic, top-down, cross-sectional illustration of an exemplary airfoil that can be used as the at least one airfoil of FIG. 1, the exemplary airfoil including a set of exemplary cells forming a set of cell webs extending linearly at an angle through the airfoil.

FIG. 8C is a schematic, top-down, cross-sectional illustration of an exemplary airfoil that can be used as the at least one airfoil of FIG. 1, the exemplary airfoil including a set of exemplary cells forming a set of cell webs forming chevrons through the airfoil.

FIG. 8D is a schematic, top-down, cross-sectional illustration of an exemplary airfoil that can be used as the at least one airfoil of FIG. 1, the exemplary airfoil including a set of exemplary cells forming a set of cell webs extending non-linearly through the airfoil.

DETAILED DESCRIPTION OF THE EMBODIMENTS

Figure 1:
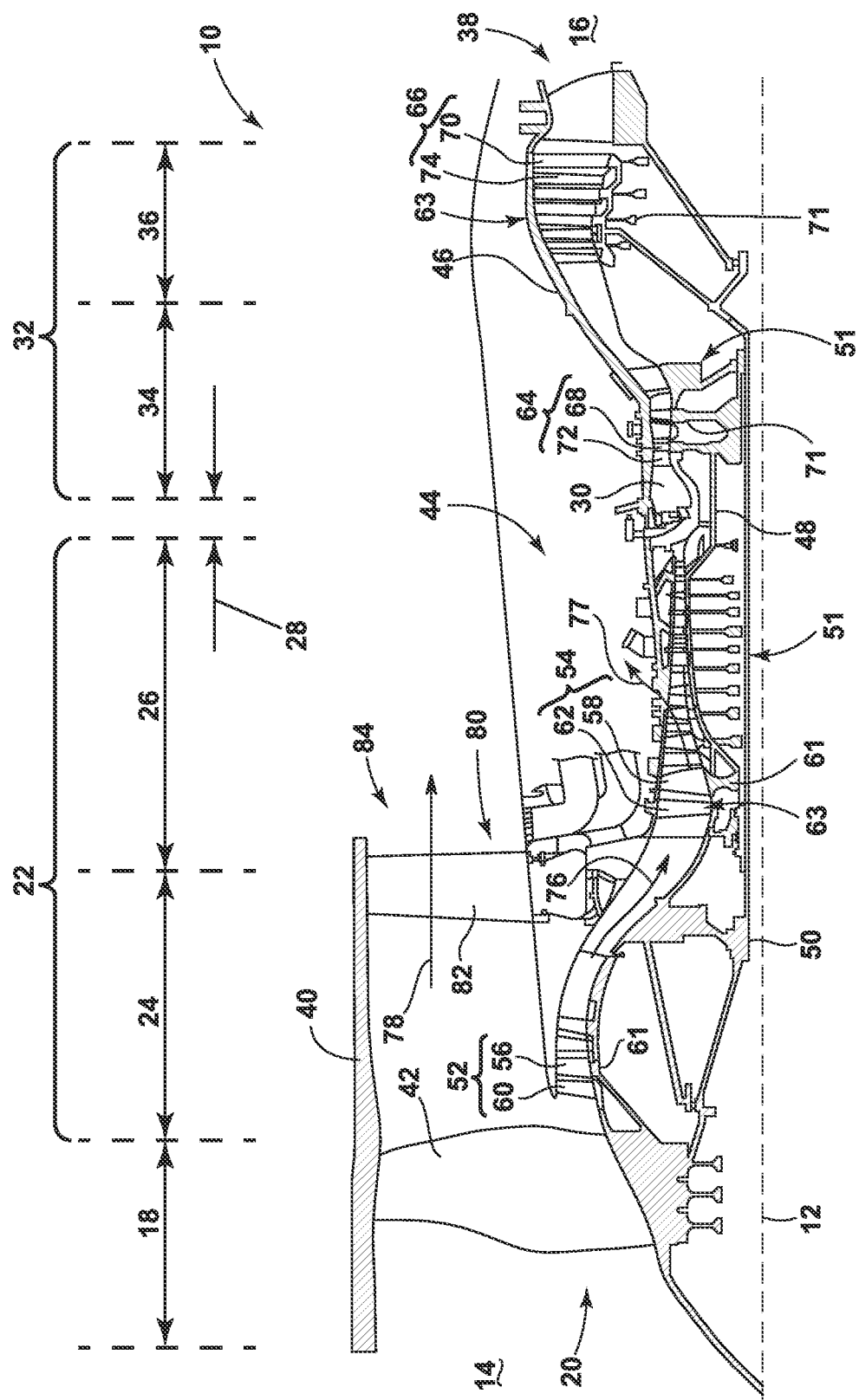
FIG. 1 is a schematic cross-sectional view of a turbine engine for an aircraft, the turbine engine including at least one airfoil.

The present disclosure relates to an airfoil for a turbine engine. As a non-limiting example, the present disclosure relates to a stationary vane provided within the fan section of the turbine engine. The airfoil can include a leading edge, a trailing edge, a tip and a root. An outer wall can extend between the leading edge and the trailing edge in a chord-wise direction and between the root and the tip in a span-wise direction. At least one cell can be provided within the interior. As used herein, the at least one cell can be defined as a structural element provided within the interior of the airfoil and having a core and a shell surrounding the at least one cell and extending between an interior portion of the outer wall of the airfoil and the core of the at least one cell. The at least one cell conforms to the contour of the outer wall. The shell of the at least one cell can include at least one fiber. The at least one fiber can include a braided fabric having a first fiber and a second fiber and extending across the entirety of the shell, and a braided fiber extending across only a portion of the shell.

The at least one fiber of at least one cell, and the overall shape of the at least one cell, as described herein, can control the mechanical properties of the airfoil to be best suited for the operation of the turbine engine. The airfoil, as described herein, has a greater control of its mechanical properties when compared to a conventional airfoil that does not include that at least one cell. As used herein, the term "mechanical properties", or iterations thereof, can refer to the ability for the airfoil to withstand various stresses and forces when the turbine engine is operated. Mechanical properties that the at least one cell can control can include, but are not limited to, an airfoil stiffness, shear capability, a torsional stiffness, or any other suitable mechanical property. It will be appreciated, that the airfoil of the turbine engine, as described herein, can have general applicability to any turbine engine such as, but not limited to, a turbine engine, a turboprop, turboshaft, a turbofan engine having a power gearbox, or the unducted fan turbine engine in non-limiting examples. It will be understood, however, that aspects of the disclosure described herein are not so limited and can have general applicability within other turbine engines. For example, the disclosure can have applicability for in other engines or vehicles, and can be used to provide benefits in industrial, commercial, and residential applications. It will be further understood that aspects of the disclosure described herein are not so limited and can have general applicability airfoils not in a turbine engine. For example, the disclosure can have general applicably for an airfoil formed as a wing, a blade, a propeller, or the like.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order, and relative sizes reflected in the drawings attached hereto can vary. As used herein, a "set" can include any number of elements, including only one. "Integral monolithic body" or "monolithic body" as used herein means a single body that is a single, non-separable piece, or formed as a single unitary piece at manufacture, as opposed to being formed by combining separate elements into one during manufacture.

FIG. 1 is a schematic cross-sectional diagram of a turbine engine, specifically a turbine engine 10 for an aircraft. The turbine engine 10 has a generally longitudinally extending axis or engine centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38. The turbine engine 10 as described herein is meant as a non-limiting example, and other architectures are possible, such as, but not limited to, the steam turbine engine, the supercritical carbon dioxide turbine engine, or any other suitable turbine engine The fan section 18 includes a fan casing 40 surrounding the fan 20. The fan 20 includes a set of fan blades 42 disposed radially about the engine centerline 12. The HP compressor 26, the combustor 30, and the HP turbine 34 form an engine core 44 of the turbine engine 10, which generates combustion gases. The engine core 44 is surrounded by core casing 46, which can be coupled with the fan casing 40.

A HP shaft or spool 48 disposed coaxially about the engine centerline 12 of the turbine engine 10 drivingly connects the HP turbine 34 to the HP compressor 26. A LP shaft or spool 50, which is disposed coaxially about the engine centerline 12 of the turbine engine 10 within the larger diameter annular HP spool 48, drivingly connects the LP turbine 36 to the LP compressor 24 and fan 20. The spools 48, 50 are rotatable about the engine centerline 12 and couple to a set of rotatable elements, which can collectively define a rotor 51.

The LP compressor 24 and the HP compressor 26 respectively include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to a disk 61, which is mounted to the corresponding one of the HP and LP spools 48, 50, with each stage having its own disk 61. The static compressor vanes 60, 62 for a stage of the compressor can be mounted to the core casing 46 in a circumferential arrangement.

The HP turbine 34 and the LP turbine 36 respectively include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50, with each stage having a dedicated disk 71. The static turbine vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24. The pressurized airflow 76 and the combustion gases can together define a working airflow that flows through the fan section 18, compressor section 22, combustion section 28, and turbine section 32 of the turbine engine 10.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the turbine engine 10 through a stationary vane row, and more particularly an outlet guide vane assembly 80, comprising a set of airfoil guide vanes 82, at the fan exhaust side 84. The set of airfoil guide vanes 82 can define a set of stationary fan vanes. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
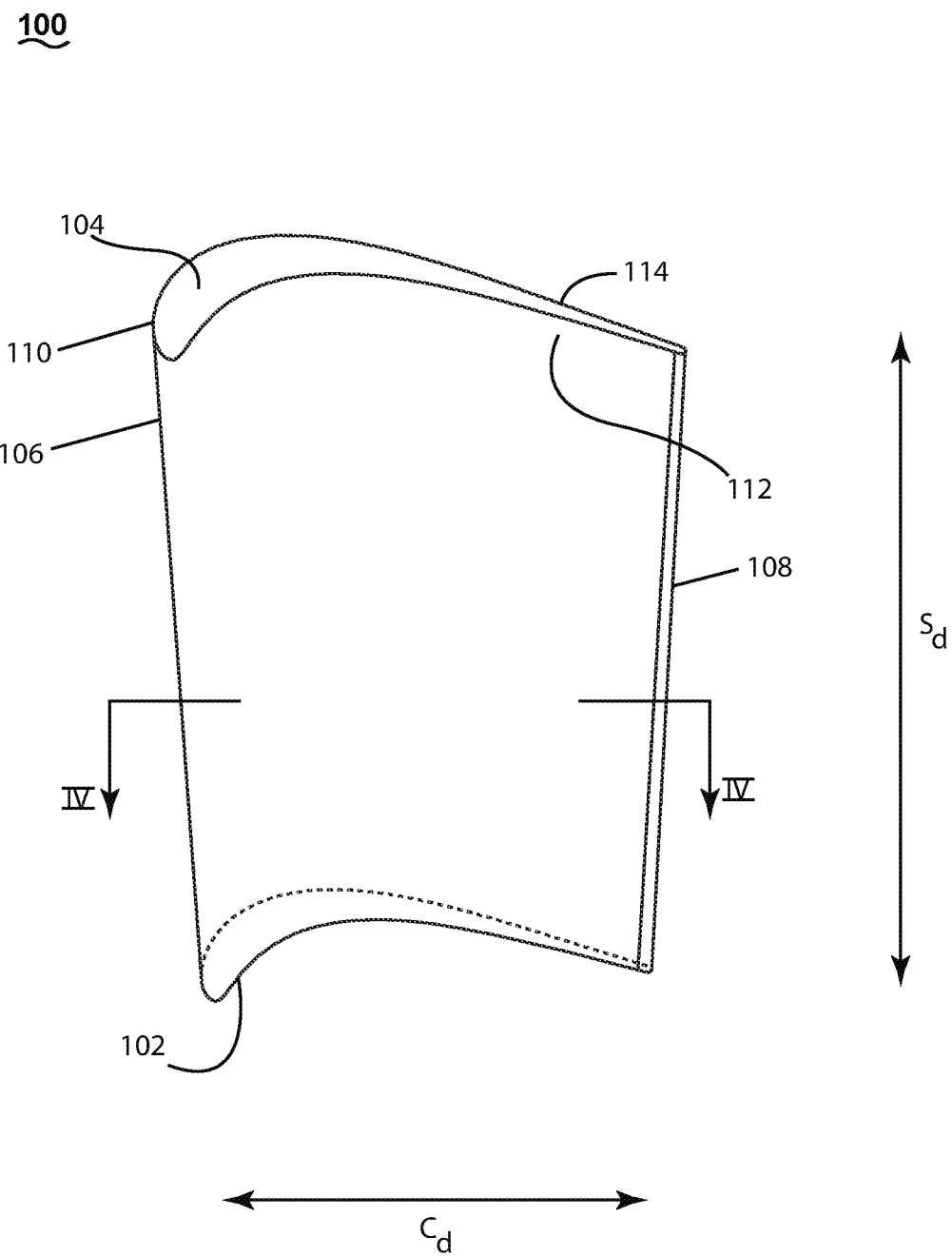
FIG. 2 is a perspective view of an airfoil that can be used as the at least one airfoil of the turbine engine of FIG. 1, including an outer wall extending span-wise from a root to a tip, and extending chord-wise from a leading edge to a trailing edge.

FIG. 2 is a perspective view of an airfoil 100 that can be used within the turbine engine 10 of FIG. 1. The airfoil 100 can be any suitable airfoil as described herein. As a non-limiting example, the airfoil can be a blade of the set of fan blades 42, the airfoil guide vane 82 (e.g., the set of stationary fan vanes), the static compressor vanes 60, 62, the rotating compressor blades 56, 58, the rotating turbine blades 68, 70, or the static turbine vanes 72, 74. The airfoil 100, however, will be described in terms of a vane that can be used in the fan section 18 or the compressor section 22.

The airfoil 100 can extend between a root 102 and a tip 104 to define a span-wise direction ($S_d$). The airfoil 100 can extend between a leading edge 106 and a trailing edge 108 to define a chord-wise direction ($C_d$). An outer wall 110 can extend in the chord-wise direction ($C_d$) between the leading edge 106 and the trailing edge 108 and in the span-wise direction ($S_d$) between the root 102 and the tip 104. The outer wall 110 can define a pressure side 112 and an opposing suction side 114 of the airfoil 100. The outer wall 110 can be formed through any suitable method and take any suitable shape. As a non-limiting example, the outer wall 110 can be formed as a composite skin. Alternatively, the outer wall 110 can be a cast wall, an additively manufacture wall, or the like.

Figure 3:
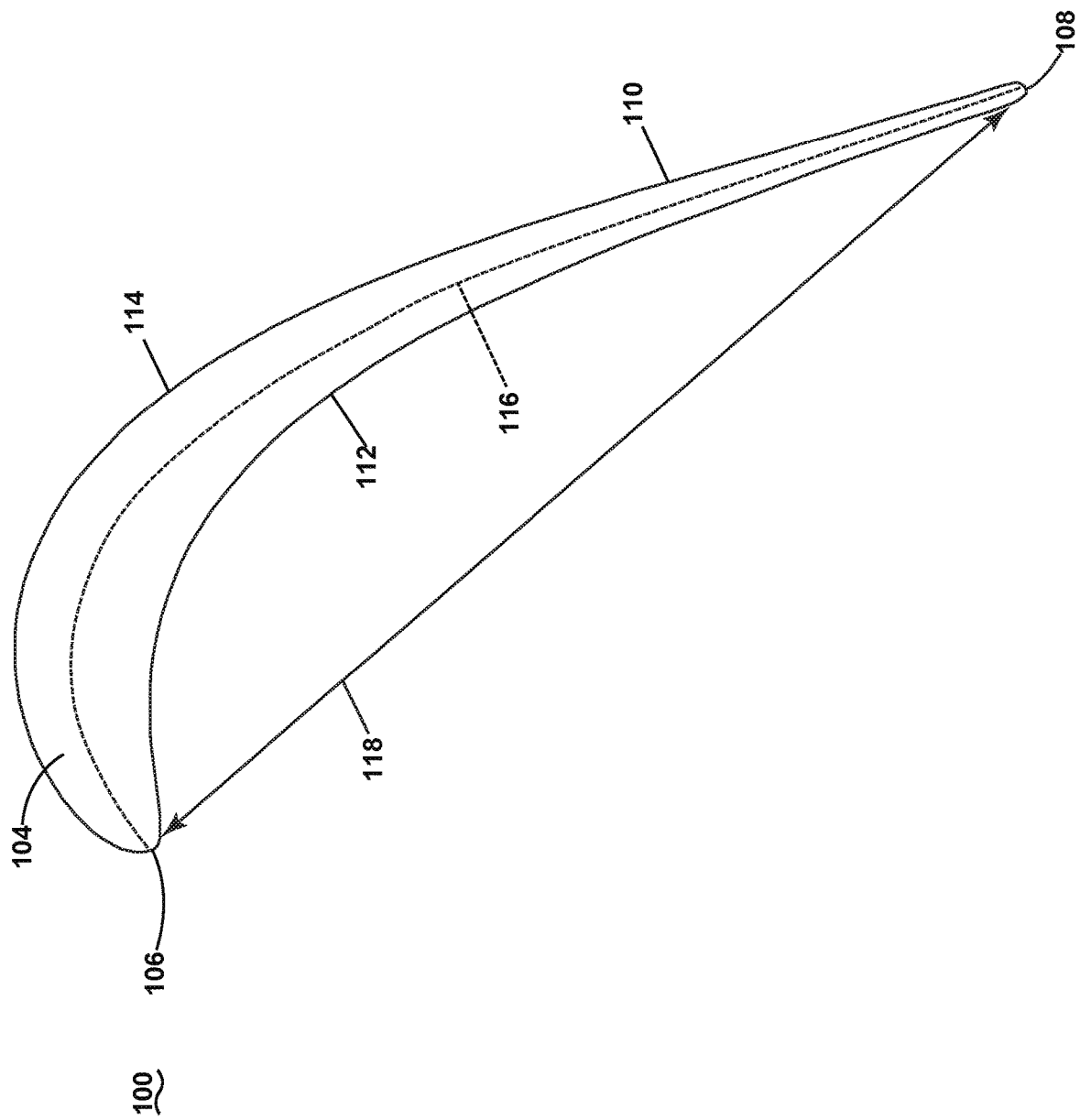
FIG. 3 is a top-down view of the airfoil of FIG. 2, including a camber line extending through the airfoil.

FIG. 3 is a top-down view of a profile of the tip 104 of the airfoil 100 of FIG. 2. It will be appreciated that the profile of the airfoil 100 can vary between root 102 and tip 104.

The profile can be defined with reference to well-known terms for defining airfoils. For example, the profile can be defined by a camber line 116, extending from the leading edge 106 to the trailing edge 108, is a line that is equidistant from the pressure side 112 of the outer wall 110 and the suction side 114 of the outer wall 110. While the airfoil 100 is shown to include a camber line 116 with a curve or camber, it will be appreciated that the airfoil 100 can include a camber line 116 without a curve, such as in a symmetrical airfoil, or otherwise no camber. A chord line 118 can be defined as the straight-line distance from the leading edge 106 to the trailing edge 108. As a non-limiting example, for a highly chambered airfoil as shown, a majority of the chord line 118 does not lay within the profile itself, as illustrated, but instead extends through the pressure side 112 area of the airfoil 100.

Figure 4:
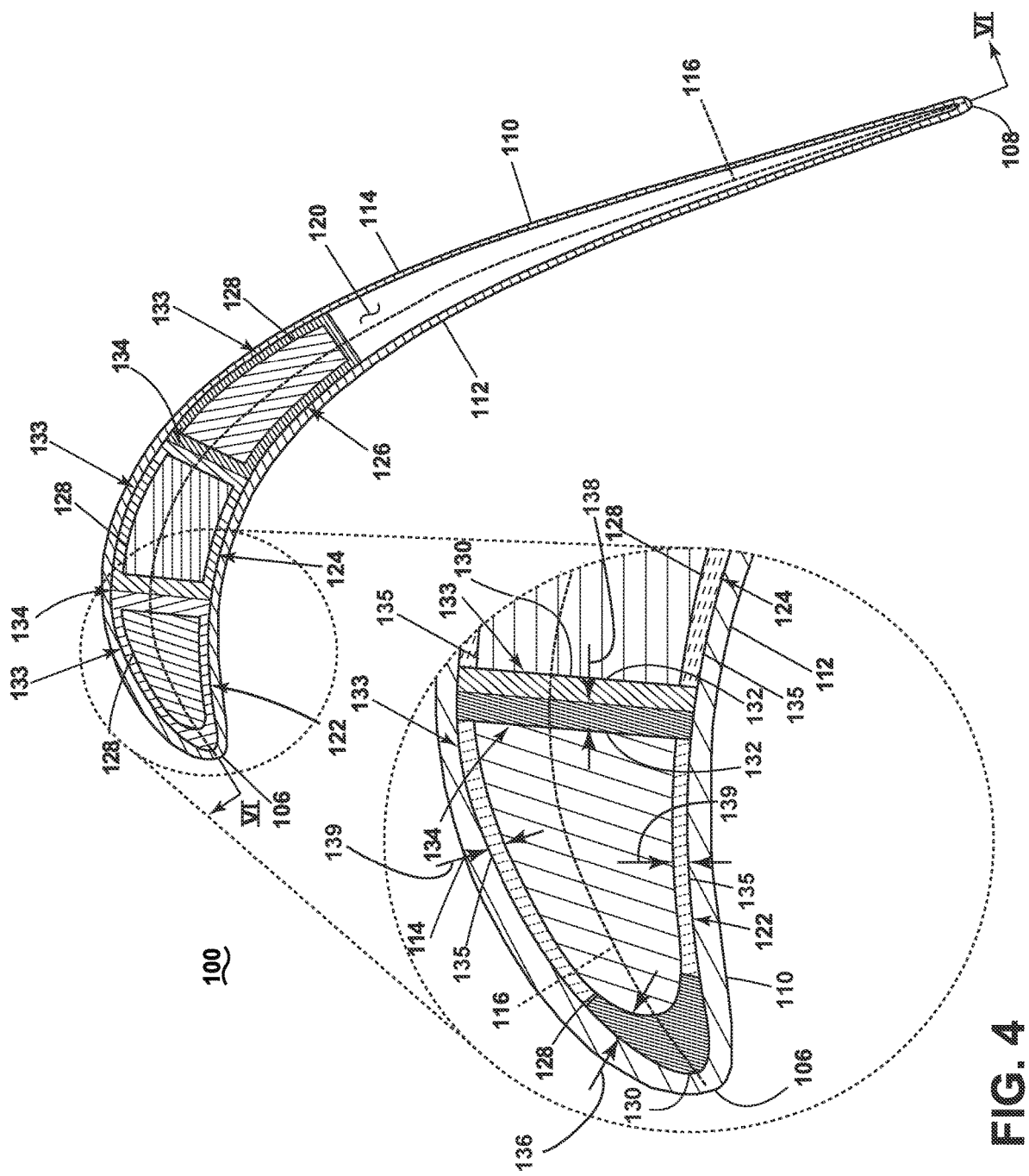
FIG. 4 is a cross-sectional, top-down view of the airfoil as seen from section IV-IV of FIG. 2, the airfoil including an interior including a first cell, a second cell, and a third cell, with each including a respective shell.

FIG. 4 is a cross-sectional, top-down view of the airfoil 100 as seen from section IV-IV of FIG. 2. The outer wall 110 of the airfoil 100 can define an interior 120. At least one cell can be provided within the interior and provide structural support to the airfoil 100 to enhance its mechanical properties. As a non-limiting example, the at least one cell can include a first cell 122, a second cell 124, and a third cell 126. The first cell 122, the second cell 124, and the third cell 126 can each be defined by a shell 133 extending around a respective core 128.

The first cell 122, the second cell 124, and the third cell 126 can each be arranged about the camber line 116 with respect to each other. As a non-limiting example, the third cell 126 can be aft the second cell 124, which can be aft the first cell 122 with respect to the camber line 116. At least a portion of the first cell 122 can correspond to the leading edge 106. At least a portion of the third cell 126 can confront a portion of the interior 120 defined by an absence of material. Alternatively, at least a portion of the third cell 126 can correspond to the trailing edge 108. While three cells are illustrated, it will be appreciated that the airfoil 100 can include any number of one or more cells. The first cell 122, the second cell 124, and the third cell 126 can extend across any suitable percentage of the interior 120, while the remaining portion of the interior 120 is defined by an absence of any cell. As a non-limiting example, the first cell 122, the second cell 124, and the third cell 126 can extend across 50% of the interior 120.

Each cell can include respective core 128 surrounded by a corresponding shell 133. The core 128 can be any suitable core such as, but not limited to, a foam core, a metallic core, or any combination thereof. Each shell 133 can include a forward portion 130, an aft portion 132, and opposing side portions 135, with respect to the camber line 116. The forward portion 130, the aft portion 132, and the opposing side portions 135 are illustrated in the enlarged section of FIG. 4 as differing cross-sections. This is for illustrative purposes only. It will be appreciated that the forward portion 130, the aft portion 132 and the opposing side portions 135 can be integrally formed or continuous with one another. The shell 133 can fully envelope or encase the core 128. The shell 133 can confront an interior portion of the outer wall 110 and an exterior portion of the core. As such, the outer wall 110 and the core 128 can sandwich the shell 133.

Each forward portion 130, aft portion 132, and opposing side portion 135 can be defined by a first thickness 136, a second thickness 138, and a third thickness 139, respectively, with respect to a plane intersecting the shell 133 and extending parallel to the camber line 116. At least one of the first thickness 136 and the second thickness 138 can both be larger than, smaller than, or equal to the third thickness 139. As a non-limiting example, the first thickness 136 and the second thickness 138 can both be larger than the third thickness 139. The second thickness 138 and the first thickness 136 can be equal or non-equal. The first thickness 136, the second thickness 138, and the third thickness 139 are only shown with respect to the first cell 122. It will be appreciated, however, that the second cell 124 and the third cell 126 can also be defined by the first thickness 136, the second thickness 138, and the third thickness 139. It will be appreciated that the first thickness 136, the second thickness 138, and the third thickness 139 can vary across the respective cell or between cells. As a non-limiting example, the first thickness 136 can be greater along the forward portion 130 than the first thickness 136 along an aft portion of the forward portion 130 with respect to the camber line 116. As a non-limiting example, a portion of the first thickness 136 can decrease towards the opposing side portions 135. It is contemplated that the portion of the forward portion 130 corresponding to and confronting the leading edge 106 can have the greatest thickness. As a non-limiting example, the first thickness 136 of the first cell 122 does not need to be equal to the first thickness 136 of the second cell 124.

Adjacent portions of adjacent cells can define a cell web 134. As a non-limiting example, the aft portion 132 of the first cell 122 and the forward portion of the second cell 124 can from a cell web 134, while the aft portion of the second cell 124 and the forward portion 130 of the third cell 126 can form another cell web 134. It will be appreciated that the airfoil 100 can include any number of two or more cells webs 134. The aft portion 132 of the first cell 122 and the forward portion 130 of the second cell form a cell web 134, while the aft portion 132 of the second cell 124 and the forward portion 130 of the third cell 126 form a cell web 134. Each cell web 134 can extend in the span-wise direction ($S_d$) through the interior 120 of the airfoil 100. The cell webs 134 can be equally spaced with respect to one another along the camber line 116. Alternatively, the spacing can be non-equal.

Figure 5:
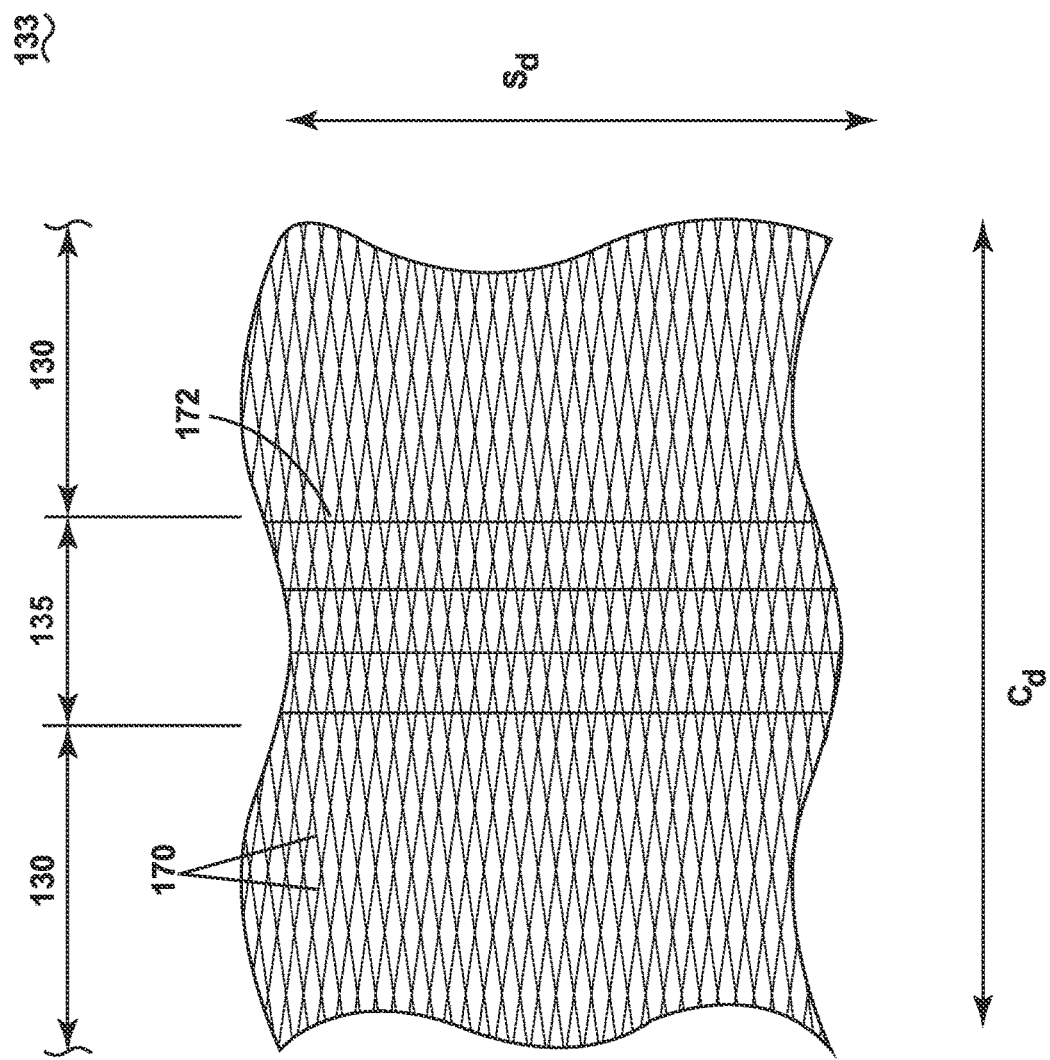
FIG. 5 is a schematic view of one of the shells of the first cell, the second cell or the third cell of FIG. 4, the shell including a braided fabric and a braided fiber.

FIG. 5 is a schematic view of a portion of the shell 133 of FIG. 4. The shell 133, as illustrated, can be the shell 133 of any of the first cell 122, the second cell 124, or the third cell 126.

The shell 133 can include at least one fiber. As a non-limiting example, the shell 133 can include a braided fabric 170 and a braided fiber 172. Both the braided fabric 170 and the braided fiber 172 can include at least two fibers. As used herein, the term "fiber" can refer to a continuous threadlike or string like textile fiber including a synthetic or natural material. As a non-limiting example, the braided fabric 170 can include a first fiber extending along a first bias and a second fiber extending along a second bias. The first bias can be different from (e.g., non-parallel to) the second bias. As a non-limiting example, the braided fiber 172 can have a third bias. The third bias can be different from (e.g., non-parallel to) the first bias and the second bias. As used herein, the term "bias", as used with respect to the braided fiber, can refer to the direction that the fiber or fibers that form the respective braided fiber are extending. As a non-limiting example, the braided fabric 170 can include at least two fibers that extend in non-parallel directions or otherwise intersect one another. As such, a weave or braid is formed, as illustrated. As such, the braided fabric 170 can include a multi-bias fiber defining the first bias and the second bias, while the braided fiber 172 can include a mono-bias fiber defining the third bias. The at least one fiber can be any suitable fiber such as, but not limited to, a metallic fiber, a carbon fiber, or any combination thereof.

The braided fabric 170 and the braided fiber 172 can extend in any suitable direction. As a non-limiting example, the braided fabric 170 including the multi-bias fiber can be any suitable fiber that extends in at least two opposing directions. As a non-limiting example, and as illustrated, the multi-bias fiber can include a first fiber extending in a first direction and a second fiber intersecting the first fiber at a single point and extending in a second direction, non-parallel to the first fiber. As a non-limiting example, the braided fabric 170 can extend in both the span-wise direction ($S_d$) and the chord-wise direction ($C_d$). This specific multi-bias fiber can be defined as a biaxial fiber. It will be appreciated, however, that the multi-bias fiber of the braided fabric 170 can be any suitable multi-bias fiber such as, but not limited to, the biaxial fiber, a helical fiber, or any other suitable woven or braided fiber. As a non-limiting example, the braided fiber 172 including the mono-bias fiber can extend linearly or non-linearly in a general single direction. As illustrated, the mono-bias fiber of the braided fiber 172 can extend linearly in the span-wise direction ($S_d$). Alternatively, the mono-bias fiber can extend in a serpentine fashion or other non-linear fashion in the span-wise direction ($S_d$). The braided fiber 172 can extend in any other suitable direction such as, but not limited to, the chord-wise direction ($C_d$), or the axial or radial directions with respect to engine centerline 12.

The braided fabric 170 can extend across the entirety of the shell 133. The braided fiber 172 can extend across at least a portion of the shell 133. As a non-limiting example, the braided fiber 172 can be provided along the opposing side portions 135. As the braided fabric 170 can extend across the entirety of the shell 133, the braided fiber 172 can be braided into or otherwise woven into the braided fabric 170. As illustrated, the braided fiber 172 can be woven into or braided into opposing sides of an intersection between opposing fibers of the braided fabric 170. Further, the braided fabric 170 can be evenly or non-evenly spaced in the chord-wise direction ($C_d$).

The illustrated shell 133 only includes a single layer of the at least one fiber. It will be appreciated, however, that there can be any number of one or more stacked layers of the at least one fiber, with each layer extending outwardly from the core 128. As such, the areas of increased thickness (e.g., the first thickness 136 of the forward portion 130 and the second thickness 138 of the aft portion 132) can be created.

Figure 6:
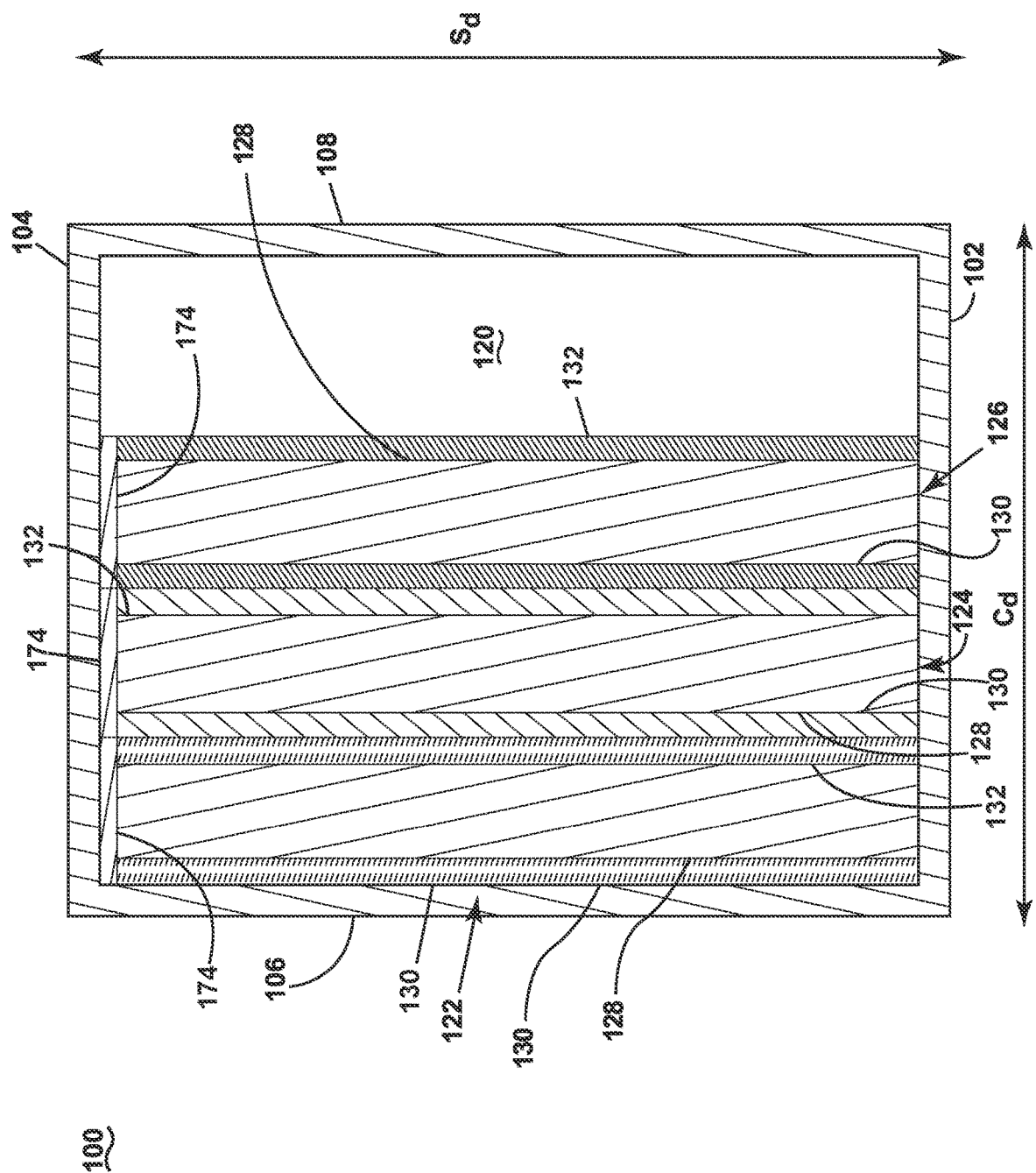
FIG. 6 is a cross-sectional side view of the airfoil of FIG. 2 as seen from section VI-VI of FIG. 4.

FIG. 6 is a cross-sectional side view of the airfoil 100 of FIG. 2 as seen from section V-V of FIG. 4. The first cell 122, the second cell 124, and the third cell 126 can each extend across the entirety of the interior 120 in the span-wise direction ($S_d$).

The first cell 122, the second cell 124 and the third cell 126 can each include a respective cap 174 provided at a distal end of the respective first cell 122, second cell 124, and third cell 126. As illustrated, the first cell 122, the second cell 124, and the third cell 126 can each include a respective cap 174 provided along a portion of the first cell 122, the second cell 124 or the third cell 126 corresponding to the tip 104 of the airfoil 100. Alternatively, the first cell 122, the second cell 124 and the third cell 126 can include a respective cap 174 provided along a portion of the first cell 122, the second cell 124 or the third cell 126 corresponding to the root 102 of the airfoil 100. Alternatively, the first cell 122, the second cell 124 and the third cell 126 can include respective caps 174 provided along portions of the first cell 122, the second cell 124 or the third cell 126 corresponding to the root 102 and the tip 104 of the airfoil 100.

During manufacture of the airfoil 100, the at least one fiber can be operably coupled to the respective core 128 through any suitable method. As a non-limiting example, the at least one fiber can be braided over the core 128 by fiber braiding. As a non-limiting example, the braided fabric 170 having the first fiber extending along the first bias and the second fiber extending along the second bias can be braided over the core 128. The braided fiber 172, having the third bias, can be braided over the core 128. As a non-limiting example, the braided fiber 172 can be woven into or braided into the braided fabric 170. It will be appreciated that the braiding of the braided fabric 170 and the braided fiber 172. It will be appreciated that the braiding of the braided fabric 170 and the braided fiber 172 can also include braiding additional layers of the braided fabric 170 or the braided fiber 172 over already braided layers of the braided fabric 170 or braided fiber 172. This, in turn, can create the increased area of thickness of braided fiber along the core 128 (e.g., the first thickness 136, the second thickness 138, and the third thickness 139). The distal ends of the core 128 can be open or otherwise not include the at least one fiber. As such, the cap 174 can be positioned to span or otherwise seal the distal ends of the core 128. The cap 174 can be provided along one or both distal ends of the core 128. It will be appreciated that braiding method of the braided fabric 170 and the braided fiber 172, along with the positioning of the cap 174 can be done for each respective cell (e.g., the first cell 122, the second cell 124 and the third cell 126). The first cell 122, the second cell 124 and the third cell 126 can then be positioned adjacent to one another as the would be within the interior 120 of the airfoil 100.

Once the respective cell(s) including the at least one fiber is made, the cell can be placed within the interior 120 of the airfoil 100. Alternatively, the outer wall 110 can be formed over the cell through any suitable method. It is contemplated that the core 128 can remain within the cell or it can further be removed through any suitable method such as, burning, melting, leeching, or any combination thereof. As a non-limiting example, the core 128 can define a hollow interior or absence of material. Each cell can be formed to correspond to a respective portion of the outer wall 110 of the airfoil 100 that it will be placed against once the outer wall 110 is formed over or placed over the cell.

During operation of the turbine engine 10, the airfoil 100 can be placed under various stresses or forces based on the location of the airfoil 100. As a non-limiting example, the airfoil 100 can be a vane provided within the fan section 18. In such an instance, the airfoil 100 can experience external forces generated by a flow of fluid flowing over the airfoil 100. This, in turn, can exert a vibrational force on the airfoil 100. The at least one cell can be provided to tailor the mechanical properties of the airfoil 100 such that it can withstand the forces it will be exerted to during operation. It will be appreciated that the forces experienced along the airfoil 100 can be non-uniform. As such, each cell can include the varying thickness (e.g., the first thickness 136, the second thickness 138, and the third thickness 139), along with the varying biases (e.g., the first bias, the second bias and the third bias) to reflect these non-uniform forces. As a non-limiting example, varying the thickness and bias of the at least one fiber can increase the stiffness of the airfoil 100. Further, the airfoil 100 can include more than one cell such that the cell web 134 can be formed between adjacent cells. The cell web 134 can be used to increase the shear capability of the airfoil 100. The increased stiffness and shear capability can ultimately result in an airfoil 100 that is tailored to the specific forces that it will experience during normal operation of the turbine engine 10. Further yet, a spacing of the cells webs 134 about the camber line 116, and the thickness of the braided fiber 172 along the cell webs 134 can be used to tailor the stiffness of the airfoil 100 along the span-wise direction ($S_d$). In other words, the stiffness of the airfoil 100 can be varied along the span-wise direction ($S_d$) by tailoring the spacing of the cell webs 134 and the thickness of the braided fiber 172.

FIG. 7A is a schematic perspective illustration of an exemplary airfoil 200 that can be used in the turbine engine 10 of FIG. 1. The exemplary airfoil 200 is similar to the airfoil 100, therefore, like parts will be identified with like numerals increased to the 200 series, with it being understood that the description of the like parts of the airfoil 100 applies to the airfoil 200 unless otherwise noted.

The airfoil 200 can include a root 202, a tip 204, a leading edge 206 and a trailing edge 208. An outer wall 210 can extend between the root 202 and the tip 204 in a span-wise direction and between the leading edge 206 and the trailing edge 208 in a chord-wise direction. The airfoil 200 can include at least one cell having at least on braided fiber. Each adjacent cell can form a cell web 234 through their adjacent braided fibers (e.g., adjacent aft and forward portions). While a perspective view from an exterior of the airfoil 200 is shown, a projection of the cell web 234 is shown.

The airfoil 200 is similar to the airfoil 100, except the airfoil 200 includes a swept back leading edge 206 and trailing edge 208, while the airfoil 100 includes a linear leading edge 106 and trailing edge 108. It will be appreciated that the airfoil 200 can include a linear leading edge 206 and trailing edge 208 like the airfoil 100, or take any other suitable airfoil shape.

The cell web 234, as illustrated, can extend linearly from the root 202 to a portion radially spaced from the root 202. As such, the cell web 234 can form a linear contour when viewed along a plane extending along the camber line and intersecting the root 202 and the tip 204. While the cell web 234 is shown to extend at a normal angle with respect to the portion of the root 202 in which it intersects, it will be appreciated that the cell web 234 can extend linearly from the root 202 at any suitable angle.

FIG. 7B is a schematic perspective illustration of an exemplary airfoil 300 that can be used in the turbine engine 10 of FIG. 1. The exemplary airfoil 300 is similar to the airfoil 100, 200, therefore, like parts will be identified with like numerals increased to the 300 series, with it being understood that the description of the like parts of the airfoil 100, 200 applies to the airfoil 300 unless otherwise noted.

The airfoil 300 can include a root 302, a tip 304, a leading edge 306 and a trailing edge 308. An outer wall 310 can extend between the root 302 and the tip 304 in a span-wise direction and between the leading edge 306 and the trailing edge 308 in a chord-wise direction. The airfoil 300 can include at least one cell having at least on braided fiber. Each adjacent cell can form a cell web 334 through their adjacent braided fibers (e.g., adjacent aft and forward portions). While a perspective view from an exterior of the airfoil 300 is shown, a projection of the cell web 334 is shown.

The airfoil 300 is similar to the airfoil 200, in that it includes a swept back leading edge 306 and trailing edge 308. It will be appreciated, however, that the airfoil 300 can take any suitable airfoil shape.

The cell web 334, as illustrated, extends from the root 302 in a non-linear fashion. As a non-limiting example, the cell web 334 can follow the contour of the leading edge 306.

Alternatively, the cell web 334 can follow the contour of the trailing edge 308. As such, the cell web 334 can form a non-linear contour when viewed along a plane extending along the camber line and intersecting the root 302 and the tip 304.

FIG. 7C is a schematic perspective illustration of an exemplary airfoil 400 that can be used in the turbine engine 10 of FIG. 1. The exemplary airfoil 400 is similar to the airfoil 100, 200, 300, therefore, like parts will be identified with like numerals increased to the 400 series, with it being understood that the description of the like parts of the airfoil 100, 200, 300 applies to the airfoil 400 unless otherwise noted.

The airfoil 400 can include a root 402, a tip 404, a leading edge 406 and a trailing edge 408. An outer wall 410 can extend between the root 402 and the tip 404 in a span-wise direction and between the leading edge 406 and the trailing edge 408 in a chord-wise direction. The airfoil 400 can include at least one cell having at least on braided fiber. Each adjacent cell can form a cell web 434 through their adjacent braided fibers (e.g., adjacent aft and forward portions). While a perspective view from an exterior of the airfoil 400 is shown, a projection of the cell web 434 is shown.

The airfoil 400 is similar to the airfoil 200, 300 in that it includes a swept back leading edge 406 and trailing edge 408. It will be appreciated, however, that the airfoil 300 can take any suitable airfoil shape.

The cell web 434, as illustrated, extends from the root 402 in a non-linear or non-uniform fashion. As a non-limiting example, the cell web 334 can undulate in a wave formation. Alternatively, the cell web 334 can extend in any suitable non-linear fashion. As such, the cell web 434 can form a wave contour when viewed along a plane extending along the camber line and intersecting the root 402 and the tip 404.

The cell web 134, 234, 334, 434 can be varied to further tailor the mechanical properties the airfoil 200, 300, 400. As a non-limiting example, the variation between the cells webs 134, 234, 334, 434 can be used to tailor the stiffness of the airfoil along the span-wise direction ($S_d$) as discussed herein. This, in turn, allows for the airfoil to be tailored for its specific use within the turbine engine 10.

FIG. 8A is a schematic, top-down, cross-sectional illustration of an exemplary airfoil 500 that can be used in the turbine engine 10 of FIG. 1. The exemplary airfoil 500 is similar to the airfoil 100, 200, 300, 400, therefore, like parts will be identified with like numerals increased to the 500 series, with it being understood that the description of the like parts of the airfoil 100, 200, 300, 400 applies to the airfoil 500 unless otherwise noted.

The airfoil 500 can include an outer wall 510 defining an interior 520. The airfoil 500 can further include a camber line 516. At least one cell can be provided within the interior 520. As a non-limiting example, the airfoil 500 can include a first cell 522, a second cell 524, and a third cell 526. The first cell 522, the second cell 524, and the third cell 526 are schematically illustrated, thus their braided fiber and cores are not shown.

The cell web 534 can be formed as any of the cells webs 134, 234, 334, 434 as described herein. The cell web 534, however, can extend linearly across the interior 520 from one side of the outer wall 510 to the other. The cell web 534 can extend from the outer wall 510 at a normal angle.

FIG. 8B is a schematic, top-down, cross-sectional illustration of an exemplary airfoil 600 that can be used in the turbine engine 10 of FIG. 1. The exemplary airfoil 600 is similar to the airfoil 100, 200, 300, 400, 500 therefore, like parts will be identified with like numerals increased to the 600 series, with it being understood that the description of the like parts of the airfoil 100, 200, 300, 400, 500 applies to the airfoil 600 unless otherwise noted.

The airfoil 600 can include an outer wall 610 defining an interior 620. The airfoil 600 can further include a camber line 616. At least one cell can be provided within the interior 620. As a non-limiting example, the airfoil 600 can include a first cell 622, a second cell 624, and a third cell 626. The first cell 622, the second cell 624, and the third cell 626 are schematically illustrated, thus their braided fiber and cores are not shown.

The cell web 634 can be formed as any of the cells webs 134, 234, 334, 434 as described herein. The cell web 634, like the cell web 534, can extend linearly across the interior 620 from one side of the outer wall 610 to the other. However, the cell web 634 can extend from the outer wall 610 at a non-normal angle that is greater than zero degrees. The cell web 534, 634 can each be defined by a linear contour when viewed in a plane parallel to the camber line 516, 616 and intersecting the first cell 522, 622, the second cell 524, 624, and the third cell 526, 626.

FIG. 8C is a schematic, top-down, cross-sectional illustration of an exemplary airfoil 700 that can be used in the turbine engine 10 of FIG. 1. The exemplary airfoil 700 is similar to the airfoil 100, 200, 300, 400, 500, 600 therefore, like parts will be identified with like numerals increased to the 700 series, with it being understood that the description of the like parts of the airfoil 100, 200, 300, 400, 500, 600 applies to the airfoil 700 unless otherwise noted.

The airfoil 700 can include an outer wall 710 defining an interior 720. The airfoil 700 can further include a camber line 716. At least one cell can be provided within the interior 720. As a non-limiting example, the airfoil 700 can include a first cell 722, a second cell 724, and a third cell 726. The first cell 722, the second cell 724, and the third cell 726 are schematically illustrated, thus their braided fiber and cores are not shown.

The cell web 734 can be formed as any of the cells webs 134, 234, 334, 434 as described herein. The cell web 734, as illustrated, can include two discrete portions or legs, which make a chevron shape. In other words, the cell web 734 can include a chevron contour when viewed in a plane parallel to the camber line 716 and intersecting the first cell 722, the second cell 724, and the third cell 726. As illustrated, an apex of the chevron can be provided along the camber line 716. It will be appreciated, however, that the apex can be offset from the camber line 716. While shown as a chevron, it will be appreciated that the cell web 734 can be formed as any suitable non-linear contour such as, but not limited to, a trapezoid.

FIG. 8D is a schematic, top-down, cross-sectional illustration of an exemplary airfoil 800 that can be used in the turbine engine 10 of FIG. 1. The exemplary airfoil 800 is similar to the airfoil 100, 200, 300, 400, 500, 600, 700 therefore, like parts will be identified with like numerals increased to the 800 series, with it being understood that the description of the like parts of the airfoil 100, 200, 300, 400, 500, 600, 700 applies to the airfoil 800 unless otherwise noted.

The airfoil 800 can include an outer wall 810 defining an interior 820. The airfoil 800 can further include a camber line 816. At least one cell can be provided within the interior 820. As a non-limiting example, the airfoil 800 can include a first cell 822, a second cell 824, and a third cell 826. The first cell 822, the second cell 824, and the third cell 826 are schematically illustrated, thus their braided fiber and cores are not shown.

The cell web 834 can be formed as any of the cells webs 134, 234, 334, 434 as described herein. The cell web 834, as illustrated, can be formed non-linearly. As a non-limiting example, the cell web 834 can be formed as a semi-circle. In other words, the cell web 834 can include a non-linear contour when viewed in a plane parallel to the camber line 816 and intersecting the first cell 822, the second cell 824, and the third cell 826. As illustrated, an apex of the non-linear contour can be provided along the camber line 816. It will be appreciated, however, that the apex can be offset from the camber line 816. While shown as a semi-circle, it will be appreciated that the cell web 834 can be formed as any suitable non-linear contour such as, but not limited to, an ellipse.

With reference to FIGS. 8A-8D, the cell web 534, 634, 734, 834 can be used to further tailor the mechanical properties the respective airfoil. As a non-limiting example, the variation between the cells webs 534, 634, 734, 834 can be used to tailor the response to impact and twist-bend coupling of the respective airfoil. This, in turn, allows for the airfoil to be tailored for its specific use within the turbine engine 10. It will be further appreciated that an exemplary airfoil can include any cell web 134, 234, 334, 434, 534, 634, 734, 834 or combination of cell webs 134, 234, 334, 434, 534, 634, 734, 834 as described herein. As a non-limiting example, an exemplary airfoil can include a first cell, a second cell and a third cell. The cell web between the first cell and the second cell can be formed like the cell web 234 and the cell web 734, while the cell web between the second and third cell can be formed like the cell web 334 and the cell web 634. In any case, with two adjacent cells, the portions of the cells that contact can follow the same contour.

Benefits of the present disclosure include an airfoil that is better tailored to its specific use in the turbine engine when compared to a conventional airfoil. For example, a conventional airfoil can include a structural support provided within the interior of the conventional airfoil. The structural support can be used to increase the mechanical properties of the conventional airfoil, however, can be difficult to manufacture and are reliant on the existing formation of the conventional airfoil (e.g., the shape of the conventional airfoil). The airfoil, as described herein, however, includes the at least one cell with the at least one fiber surrounding the core of the at least one cell. As discussed herein, the braided fiber can include the braided fabric and the braided fiber, which can have differing biases and differing thickness in the span-wise and chord-wise directions. This, in turn, means that that the cell can be tailored to provided mechanical properties to specific portions of the airfoil based on the expected forces that said portion of the airfoil will experience. Further yet, the airfoil can include multiple cells (e.g., the first cell, second cell, and third cell), with cell webs being formed between adjacent cells. These cell webs can be varied in orientation such that they further tailor the mechanical properties of the airfoil. This, in turn, results in an airfoil with increased and better tailored mechanical properties for its intended use within the turbine engine when compared to the conventional airfoil To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

An airfoil for a turbine engine, the airfoil comprising an outer wall, defining an interior and a camber line extending through the airfoil, the outer wall extending between a leading edge to a trailing edge to define a chord-wise direction, and between a root and a tip to define a span-wise direction, and at least one cell, located within the interior, and having a shell, the shell comprising a forward portion and an aft portion with respect to the camber line, connected by side portions, a braided fabric having a first fiber extending along a first bias and a second fiber extending along a second bias, different from the first bias, provided along the forward portion, the aft portion, and the side portions, and a braided fiber extending along a third bias, different from the first bias and the second bias, the braided fiber being provided along at least one of the side portions.

The airfoil of any preceding clause, wherein the braided fiber is braided into the braided fabric.

The airfoil of any preceding clause, wherein a distribution of the braided fabric and the braided fiber is non-uniform along the at least one cell.

The airfoil of any preceding clause, wherein the forward portion of the shell is defined by a first thickness, the aft portion is defined by a second thickness, and at least one of the side portions is defined by a third thickness, smaller or larger than the first thickness and the second thickness, when viewed along a plane intersecting the shell and parallel to the camber line.

The airfoil of any preceding clause, wherein the first thickness is non-equal to the second thickness.

The airfoil of any preceding clause, wherein the forward portion confronts an interior portion of the outer wall that defines the leading edge.

The airfoil of any preceding clause, wherein the first thickness, the second thickness, and the third thickness are non-equal about the extent of the forward portion, the aft portion, and the at least one of the side portions, respectively.

The airfoil of any preceding clause, wherein at least one of the forward portion or the aft portion is defined by a contour having a linear, non-linear, or wave contour when viewed along a plane extending along the camber line and intersecting the root and the tip.

The airfoil of any preceding clause, wherein the at least one cell includes a first cell and a second cell located aft of and adjacent to the first cell with respect to the camber line, wherein the aft portion of the first cell contacts a forward portion of the second cell, and wherein the contour the aft portion of the first cell corresponds to a contour of the forward portion of the second cell.

The airfoil of any preceding clause, wherein the contour follows a contour of the outer wall in the span-wise direction.

The airfoil of any preceding clause, wherein the at least one of the forward portion or the aft portion is defined by a linear, non-linear, or chevron contour when viewed in a plane parallel to the camber line and intersecting the forward portion and the aft portion.

The airfoil of any preceding clause, wherein the at least one cell is included within a set of spaced cells having at least a first cell and a second cell aft of and adjacent to the first cell with respect to camber line, and wherein a forward portion of the second cell and an aft portion of the first cell confront each other to form a cell web.

The airfoil of any preceding clause, wherein the cell web forms at least one of a linear, non-linear, or chevron contour when viewed in a plane parallel to the camber line and intersecting the forward portion and the aft portion, and at least one of a linear, non-linear, or wave contour when viewed along a plane extending along the camber line and intersecting the root and the tip, wherein each cell of the set of cells follows a contour of a portion of the outer wall that it confronts, and wherein each cell of the set of cells extends between the root and the tip of the outer wall.

The airfoil of any preceding clause, wherein the at least one cell includes a core and the shell surrounds the core, wherein the core is at least one of a sacrificial core or a non-sacrificial core, and wherein the braided fabric and the braided fiber are braided continuously over the non-sacrificial foam core during manufacture of the airfoil.

The airfoil of any preceding clause, wherein the turbine engine is a turbofan engine including a fan section, and wherein the airfoil is a vane provided within the fan section.

An airfoil comprising an outer wall, defining an interior and a camber line extending through the airfoil, the outer wall extending between a leading edge to a trailing edge to define a chord-wise direction, and between a root and a tip to define a span-wise direction, and at least one cell, located within the interior, and having a shell, the shell comprising a forward portion and an aft portion with respect to the camber line, connected by side portions. a braided fabric having a first fiber extending along a first bias and a second fiber extending along a second bias, different from the first bias, provided along the forward portion, the aft portion, and the side portions, and a braided fiber extending along a third bias, different from the first bias and the second bias, the braided fiber being provided along at least one of the side portions.

The airfoil of any preceding clause, further comprising a plurality of spaced cells having the at least one cell, wherein each cell of the plurality of spaced cells are spaced axially from one another with respect to the camber line.

The airfoil of any preceding clause, wherein each cell of the plurality of spaced cells includes a respective braided fabric with a respective first bias and a respective braided fiber having a respective second bias, and wherein at least one of a first bias or a second bias of one cell of the plurality of spaced cells can differ from or be identical to a first bias or second bias, respectively, of another cell of the plurality of spaced cells.

A method of forming an airfoil, the method comprising braiding a first braided fabric having a first fiber extending along a first bias and a second fiber extending along a second bias, different form the first bias, over an entirety of a first core, braiding a first braided fiber along a second bias defined by a mon-bias fiber over a portion of the first core, and encasing at least a portion of a cell defined by the core, the first braided fabric and the first braided fiber with a shell.

The method of any preceding clause, further comprising braiding a second braided fabric having a first fiber extending along a first bias and a second fiber extending along a second bias, different form the first bias, over an entirety of a second core, braiding a second braided fiber along a third bias, different from the first bias and the second bias, over a portion of that second core, and positioning the second core adjacent to the first core.

What is claimed is:

1. A turbine engine, comprising:
   a fan section, a compressor section, a combustion section, and a turbine section in serial flow arrangement; and
   an airfoil provided within at least one of the fan section, the compressor section, or the turbine section, the airfoil comprising:
      an outer wall extending between a leading edge to a trailing edge to define a chord-wise direction, and between a root and a tip to define a span-wise direction, the outer wall defining an interior, a pressure side, a suction side, and a camber line extending through the interior between the leading edge and the trailing edge equidistant between the suction side and the pressure side, the interior extending a first distance along the camber line; and
      a set of cells located within the interior, the set of cells extending a distance along the camber line a second distance, the second distance being less than the first distance, each cell of the set of cells having a shell comprising:
         a forward portion and an aft portion provided aft of the forward portion with respect to the camber line, the forward and the aft portion being connected by side portions; and
         a braided fabric having a first fiber extending along a first bias and a second fiber extending along a second bias, different from the first bias, provided along the forward portion, the aft portion, and the side portions.

2. The turbine engine of claim 1, wherein the airfoil further comprises a braided fiber that is braided into the braided fabric.

3. The turbine engine of claim 2, wherein a distribution of the braided fabric and the braided fiber is non-uniform along each cell of the set of cells.

4. The turbine engine of claim 1, wherein the forward portion of the shell is defined by a first thickness, the aft portion is defined by a second thickness, and at least one of the side portions is defined by a third thickness, smaller or larger than the first thickness and the second thickness, when viewed along a plane intersecting the shell and parallel to the camber line.

5. The turbine engine of claim 4, wherein the first thickness is non-equal to the second thickness.

6. The airfoil of claim 5, wherein the forward portion of an axially forward most cell of the set of cells, with respect to the camber line, confronts an interior portion of the outer wall that defines the leading edge.

7. The turbine engine of claim 4, wherein the first thickness, the second thickness, and the third thickness are non-equal about an extent of the forward portion, the aft portion, and the at least one of the side portions, respectively.

8. The turbine engine of claim 1, wherein at least one of the forward portion or the aft portion is defined by a contour in the span-wise direction, the contour having at least one of a linear contour, a non-linear contour, or a wave contour.

9. The turbine engine of claim 1, wherein each cell of the set of cells includes a contour in the span-wise direction that follows a contour of the outer wall in the span-wise direction.

10. The turbine engine of claim 1, wherein the at least one of the forward portion or the aft portion includes a contour in the chord-wise direction that is defined by a linear contour, a non-linear contour, or a chevron contour.

11. An airfoil comprising:
  an outer wall extending between a leading edge to a trailing edge to define a chord-wise direction, and between a root and a tip to define a span-wise direction, the outer wall defining an interior, a pressure side, a suction side, and a camber line extending through the interior between the leading edge and the trailing edge equidistant between the suction side and the pressure side; and
  at least one cell, located within the interior, and having a shell, the shell comprising:
    a forward portion and an aft portion, the aft portion being provided aft of the forward portion with respect to the camber line, the forward portion and the aft portion being connected by side portions, with at least a portion of at least one of the forward portion or the aft portion being defined by a contour extending in the span-wise direction, the contour having at least one of a linear, non-linear, or wave contour; and
    a braided fabric having a first fiber extending along a first bias and a second fiber extending along a second bias, different from the first bias, provided along the forward portion, the aft portion, and the side portions.

12. The turbine engine of claim 1, wherein the set of cells include a plurality of cells.

13. The turbine engine of claim 2, wherein each cell of the set of cells includes a core and the shell surrounds the core, wherein the core is at least one of a sacrificial core or a non-sacrificial core, and wherein the braided fabric and the braided fiber are braided continuously over the non-sacrificial core during manufacture of the airfoil.

14. The turbine engine of claim 1, wherein the airfoil is a vane provided within the fan section.

15. The airfoil of claim 11, further comprising a plurality of spaced cells having the at least one cell, wherein each cell of the plurality of spaced cells are spaced axially from one another with respect to the camber line.

16. The airfoil of claim 15, wherein each cell of the plurality of spaced cells includes a respective braided fabric with a respective first bias and a respective braided fiber braided into the braided fabric, the respective braided fiber having a respective second bias, and wherein at least one of a first bias or a second bias of one cell of the plurality of spaced cells can differ from or be identical to a first bias or second bias, respectively, of another cell of the plurality of spaced cells.

17. A method of forming an airfoil, the method comprising:
  providing an outer wall of the airfoil, the outer wall extending between a leading edge to a trailing edge to define a chord-wise direction, and between a root and a tip to define a span-wise direction, the outer wall defining an interior, a pressure side, a suction side, and a camber line extending trough the interior between the leading edge and the trailing edge equidistant between the suction side and the pressure side, and
  providing a shell by:
    braiding a first braided fabric having a first fiber extending along a first bias and a second fiber extending along a second bias, different form the first bias, over an entirety of a first core;
    providing, at least partially by the first braided fabric, a first portion, a second portion, and opposing walls, with the first potion and the second portion interconnecting respective portions of the opposing walls;
    providing at least one of the first portion or the second portion with a contour extending in the chord-wise direction, the contour forming at least one of a non-linear or chevron contour; and
    braiding a first braided fiber along a third bias, different from the first bias and the second bias, over a portion of the first core; and
  encasing at least a portion of a cell defined by the first core, the first braided fabric and the first braided fiber within the interior.

18. The method of claim 17, further comprising:
  braiding a second braided fabric having a third fiber extending along a fourth bias and a fourth fiber extending along a fifth bias, different form the fourth bias, over an entirety of a second core;
  braiding a second braided fiber along a sixth bias, different from the third bias and the fourth bias, over a portion of that second core; and
  positioning the second core adjacent to the first core.

19. The turbine engine of claim 12, wherein axially adjacent cells of the plurality of cells form a cell web therebetween, with the cell web extending in the span-wise direction.

20. The airfoil of claim 19, wherein the cell web forms:
  at least one of a linear contour, a non-linear contour, or a chevron contour in the chord-wise direction; and
  at least one of a linear contour, a non-linear contour, or a wave contour in the span-wise direction;
  wherein each cell of the set of cells follows a contour of a portion of the outer wall that it confronts, and wherein each cell of the set of cells extends between the root and the tip of the outer wall.

* * * * *